(12) United States Patent
Pleyer

(10) Patent No.: US 7,305,925 B2
(45) Date of Patent: Dec. 11, 2007

(54) VOLUMETRIC METERING DEVICE FOR THE METERED DELIVERY OF GRANULAR AND POWDERY MATERIALS PARTICULARY FOR MACHINES FOR DISTRIBUTING SUCH MATERIALS

(75) Inventor: Peter Pleyer, Bienenweg (DE)

(73) Assignee: Gaspardo Seminatrici S.p.A., Morsano al Tagliamento (IT)

( * ) Notice: Subject to any disclaimer, the term of this patent is extended or adjusted under 35 U.S.C. 154(b) by 212 days.

(21) Appl. No.: 10/520,093

(22) PCT Filed: Jul. 5, 2002

(86) PCT No.: PCT/IT02/00443

§ 371 (c)(1),
(2), (4) Date: Jan. 4, 2005

(87) PCT Pub. No.: WO2004/015378

PCT Pub. Date: Feb. 19, 2004

(65) Prior Publication Data

US 2005/0263052 A1    Dec. 1, 2005

(51) Int. Cl.
*A01C 7/00* (2006.01)
*A01C 9/00* (2006.01)
(52) U.S. Cl. ..................... 111/175; 111/179
(58) Field of Classification Search ............... 111/170, 111/174–185; 221/211
See application file for complete search history.

(56) References Cited

U.S. PATENT DOCUMENTS

| 4,602,727 | A | 7/1986 | Jackson |
| 5,002,084 | A | 3/1991 | Wilson |
| 5,003,894 | A | 4/1991 | Lafferty |
| 5,413,256 | A | 5/1995 | Mitchell et al. |
| 5,826,523 | A | 10/1998 | Gregor |

FOREIGN PATENT DOCUMENTS

| DE | 44 31 287 | 10/1995 |
| DE | 198 15 198 | 10/1999 |
| EP | 0 259 633 | 3/1988 |
| EP | 0 358 878 | 3/1990 |
| EP | 0 597 196 | 5/1994 |
| GB | 2 322 431 | 8/1998 |

*Primary Examiner*—Christopher J. Novosad
(74) *Attorney, Agent, or Firm*—Stradley Ronon Stevens & Young, LLP

(57) ABSTRACT

A volumetric metering device for the metered delivery of granular and powdery materials, particularly for machines for distributing such materials. The device comprises a housing formed in one piece of plastic material, a metering member which is supported rotatably in the housing, can be handled individually, and includes a plurality of metering wheels mounted on a shaft and clamped in a group between two flanges, a selective drive-transmission interposed between the wheels and the shaft, a scraper for cleaning the wheels in motion and anchoring the idle wheels, and a feeler device which is held at a distance from the metering member with resilient preloading.

54 Claims, 6 Drawing Sheets

VOLUMETRIC METERING DEVICE FOR THE METERED DELIVERY OF GRANULAR AND POWDERY MATERIALS PARTICULARY FOR MACHINES FOR DISTRIBUTING SUCH MATERIALS

TECHNICAL FIELD

The subject of the present invention is a metering device for the metered delivery of granular and powdery materials, particularly for machines for distributing such materials.

TECHNOLOGICAL BACKGROUND

Volumetric metering devices are used widely in many different technical fields in which there is a need to deliver a substantially continuous and measured flow of material over time. For example, the technical field of agricultural sowing machines with pneumatic seed-transportation is typical; in these machines it is known to provide a seed-loading hopper at the base of which a metering device, generally of the volumetric type with blades, is fitted and supplies metered quantities of seeds into a Venturi duct by which the seeds are admitted to an air-flow and transported to the sowing drills.

The particular and preferred application of the invention is in all cases in which it is necessary to vary the flow-rate delivered, possibly within a fairly large range of values.

Typical metering devices formed in accordance with the prior art are described, for example, in EP 0702890, EP 0606541, EP 0471155, and U.S. Pat. No. 6,138,591.

Conventional metering devices normally comprise a box-like structure in which a bladed metering member is supported rotatably and cooperates with a flow-restricting device for regulating the flow-rate delivered. In one example, the restricting device comprises a jacket movable axially in an adjustable manner relative to the rotor of the distributor so as to cover a portion of the set of blades in order to reduce the overall capacity of the cells available. Alternatively, the rate of rotation of the metering member may be varied, or the capacity of the cells may be varied.

A first problem resulting from the known structure of conventional distributors is that they do not permit large adjustments of flow-rate whilst maintaining constant regulation of the metering for each adjustment. In fact, there are critical speeds of the metering member beyond which its reliability is reduced.

A second problem typical of known structures is that they comprise a plurality of parts which have to be assembled using connections, screws, flanges, etc. This construction is rather unsuitable for agricultural machines for which many adjustments have to be performed in the field and the consequent need to remove various parts may lead to their loss, making re-assembly impossible.

A further problem characteristic of conventional metering devices is that they are subject to irremediable damage, or at least to blockage of the metering member, when foreign bodies of considerable size reach the rotor. In the absence of a timely indication of this situation, particularly during sowing, it is possible, completely unwittingly, to sow whole fields unevenly or not at all.

An object of the present invention is to provide an improved volumetric metering device that solves one or more of the problems identified above.

SUMMARY OF THE INVENTION

These problems and yet others which will become clearer from the following description are addressed and solved by the subject invention. In one embodiment, the invention is a volumetric metering device for the metered delivery of granular and powdery materials, particularly for machines for distributing such materials, comprising a housing and a metering member supported rotatably in the housing, characterized in that the housing is formed in a single piece. In another embodiment, the metering member comprises at least one metering wheel clamped between a pair of flanges, the housing comprising juxtaposed openings at least one of which has dimensions such as to allow the metering member, complete with the at least one wheel and the flanges, to pass from and towards the housing, at least one of the flanges being arranged to close the respective opening when the metering member is fitted in the operative position in the housing, and constituting a mechanism for the rotatable support of the metering member in the housing.

In another embodiment, the metering member includes a plurality of metering wheels which are structurally independent of one another and are interposed in a group between a pair of flanges, and a shaft acting as a tie between the flanges in order to clamp in a group the flanges and the metering wheels interposed between them, to constitute a unit which can be handled individually. In yet another embodiment of the present invention, the metering member carries a plurality of metering wheels having blades and being clamped together in a group, characterized in that the blades have appendages restraining the blades of one wheel on the blades of the adjacent wheel.

The metering member of a further embodiment of the present invention has metering wheels clamped in a group and keyed to a common drive-transmission shaft. A selective drive-transmission mechanism is interposed between the wheels and the shaft in order to exclude the wheels from driving by the shaft or, conversely, to connect the wheels for driving by the shaft.

Pursuant to another embodiment, the invention is a volumetric metering device for the metered delivery of granular and powdery materials, particularly for machines for distributing such materials, comprising a housing, a metering member supported rotatably in the housing, and a feeler device mounted in the housing and active in the manner of a scraper blade with a lip thereof operative on the metering member. A restraining mechanism is active on the feeler device in order to keep it a predetermined distance from the metering member. A resilient preloading mechanism is active on the feeler device in order to press its operative lip towards the metering member with a predetermined preload. Whether it includes a restraining mechanism and a resilient preloading mechanism or not, the volumetric metering device may be modified to include an element for altering locally the angle of introduction between the feeler device and the metering member; the element is associated with the feeler device and located immediately upstream of the operative lip.

It is to be understood that both the foregoing general description and the following detailed description are exemplary, but are not restrictive, of the invention.

BRIEF DESCRIPTION OF THE DRAWINGS

The characteristics and the advantages of the invention will become clearer from the detailed description of a preferred but not exclusive embodiment described by way of non-limiting example, with reference to the appended drawings, in which.

PREFERRED EMBODIMENT OF THE INVENTION

Figure 1:
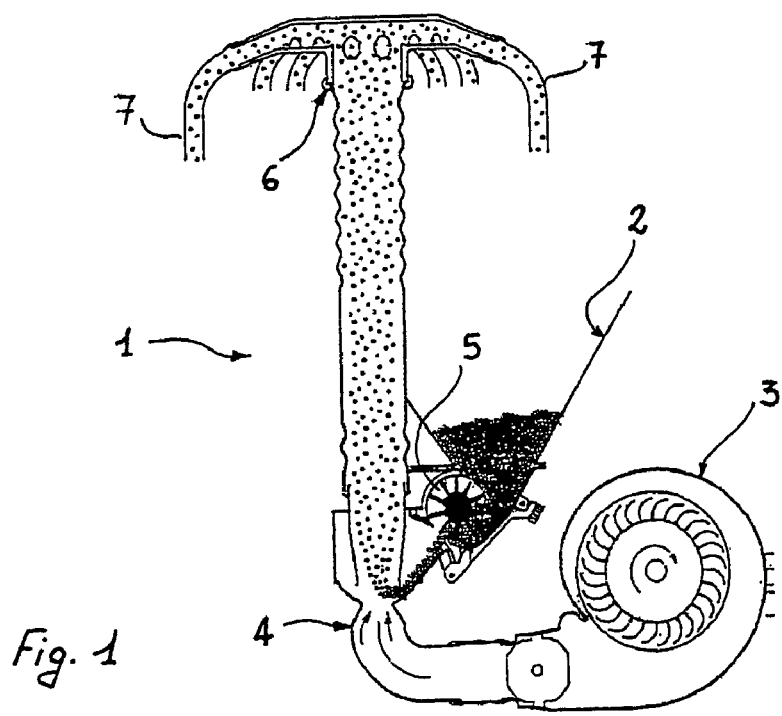
FIG. 1 is a schematic view showing, in section, the basic components of a machine for distributing granular materials.
Figure 11:
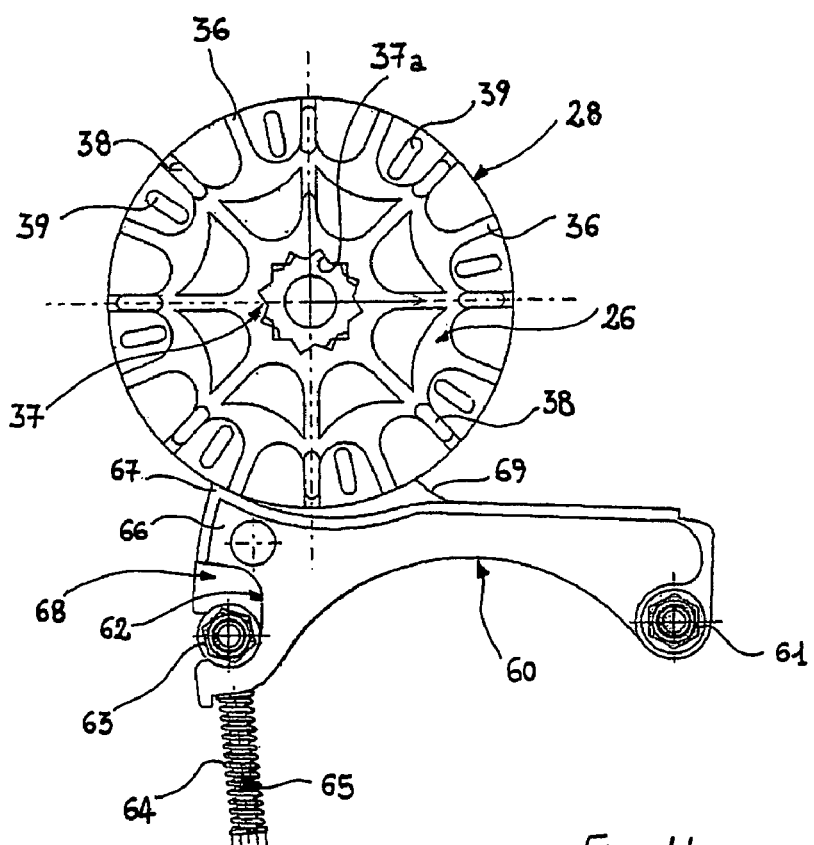
FIG. 11 is a side view of a further detail of the device of FIG. 2.

With reference to FIG. 1, a machine for distributing granular materials, useful both for sowing seeds and for spreading manure, disinfectants, and the like, is generally indicated by the number 1. The machine 1 comprises, basically, one or more hoppers 2 for holding the material to be spread, a blower 3 which delivers an air-flow under pressure to an air injector 4, a metering device 5 which supplies metered quantities of the material present in the hopper into the air-flow generated by the blower 3, and a distributor 6 which distributes the mixed flow of air and material transported thereby towards distribution ducts 7.

Figure 2:
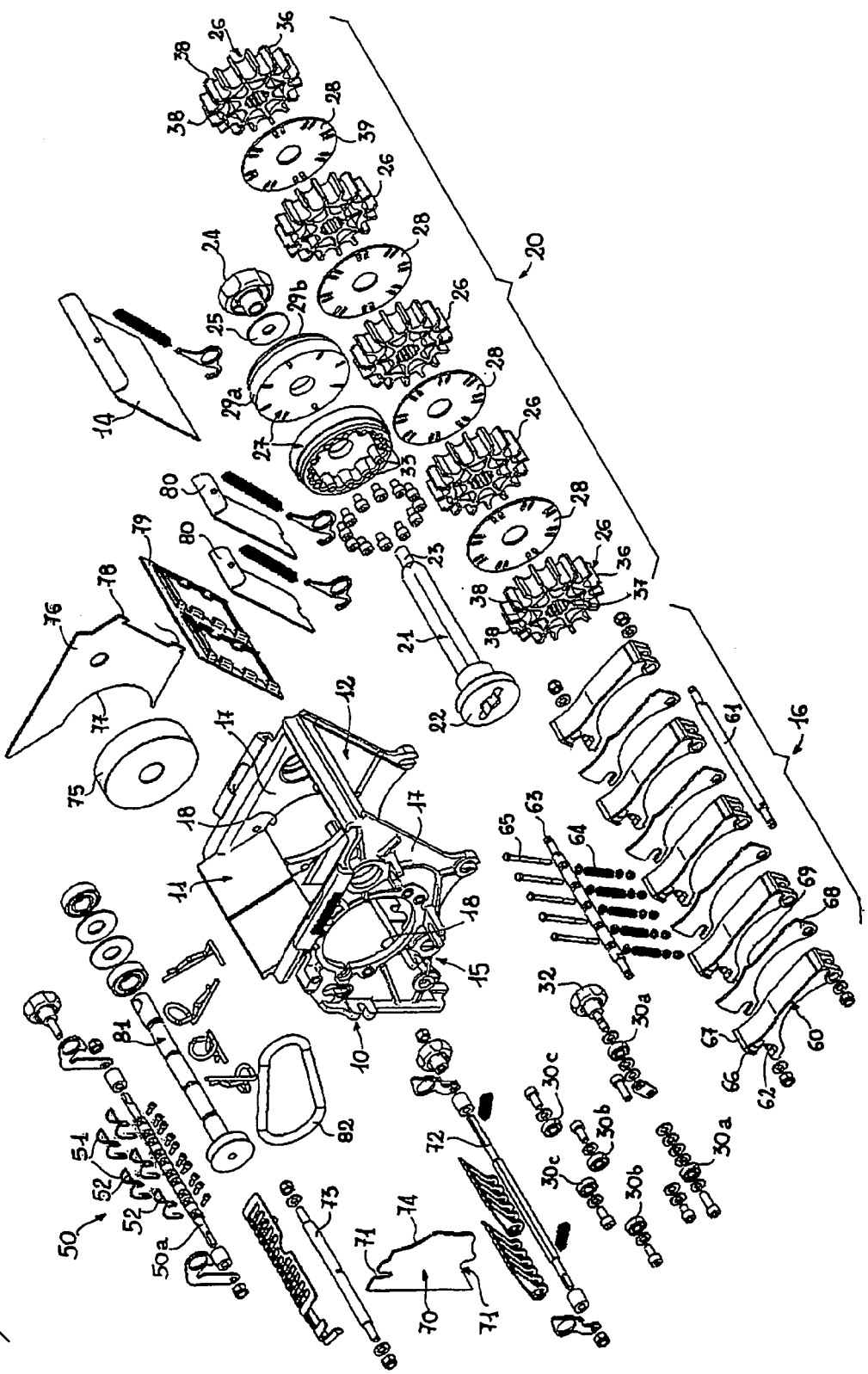
FIG. 2 is an exploded, perspective view of a delivery device formed in accordance with the present invention.

The metering device 5 can advantageously be constructed in accordance with one or more of the teachings of the present invention and is shown in detail in FIG. 2 and the subsequent figures.

The metering device 5 comprises a housing 10 which, by virtue of the provisions of the invention, can advantageously be constructed in a single piece (i.e., as one complete, integral, and monolithic unit) by molding plastic material. The housing 10 comprises a first, upper opening 11 which is open towards the hopper 2; a second, rear opening 12, closed in an openable manner by a removable door 14; and an opposed, third opening 15 which admits the granular material to the region of the air injector 4. The housing 10 is closed at the bottom by a feeler member 16 which will be described further below.

The housing 10 further comprises opposed side walls 17 having two circular and coaxial through-holes 18. The holes 18 serve for housing a metering member, generally indicated 20, in the housing 10.

The metering member 20 comprises a shaft 21 of polygonal, preferably square, cross-section, having, at one end, a joint 22 coupling the shaft 21 for rotation with a drive shaft (not shown) and, at the other, opposite end, a threaded shank 23 onto which a hand wheel 24 is screwed with the interposition of a washer 25. The assembly serves to clamp to the shaft 21 a plurality of metering wheels 26, included in a group between two flanges 27 and intercalated with discs 28.

The flanges 27 are identical to one another and each has two external tracks 29a, 29b which serve to support the metering member 20 in the housing 10 rotatably but with axial restraint. Support is achieved by three or more bearings 30a, 30b, 30c, the outer portions of which are in rolling contact with one or other of the tracks 29a, 29b. The axial restraint is not actually necessary for the operation of the device since the shaft 21 is itself fixed axially relative to the housing 10 as a result of its connection to the drive shaft by the joint 22. However, to prevent the metering member 20 from accidentally coming out of the housing 10 when the device is released from the drive shaft, the tracks 29a, 29b have different diameters (the track 29a, closer to the side wall 17 of the housing 10, has a larger diameter) and one bearing 30a is fixed to the housing 10 removably by the hand wheel 32 and is engaged on the track 29b so that the shoulder existing between the two tracks performs the desired axial restraint. In order to remove the metering member 20 from the housing 10, the hand wheel 32 is slackened, removing the bearing 30a and with it the axial restraint preventing the metering member 20 from slipping out.

Both of the flanges 27, or at least one of them, may have a ring of axial seats 33 for cores (for examples, screws) cooperating with a proximity detector (not shown) in order to measure the rate of rotation of the metering member 20.

Each metering wheel 26 is molded of plastic material and comprises a plurality of blades 36 which extend radially from a hub 37 having an axial hole 37a with a channelled profile. The channels have a profile which can be coupled with the shaft 21 and the number of channels is a multiple of the number of sides of the shaft so as to permit different angular positionings of the wheels 26 on the shaft 21. The wheels 26 can thus be mounted in a manner such that they are offset angularly relative to one another, improving the uniformity of the output.

Both to take account of this angular offset and to strengthen the blades 36, at their free ends, axial appendages 38 are provided on the blades 36 and are housed in corresponding holes 39 in the discs 28. The discs 28 have circular holes and are not otherwise driven by the shaft 21.

Figure 3:
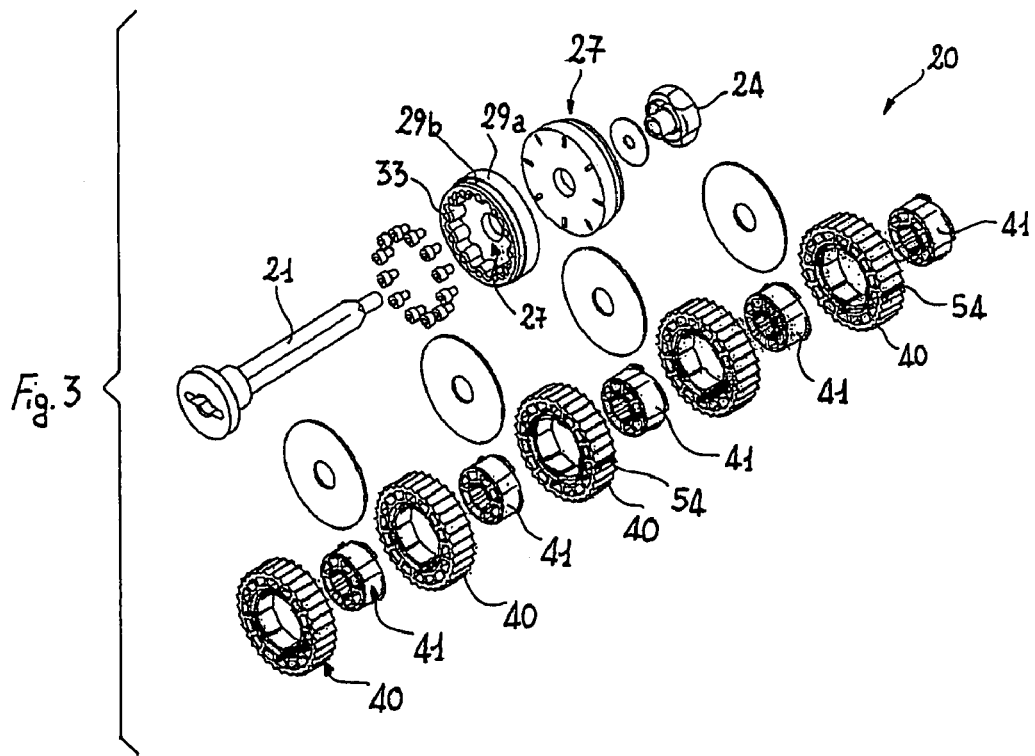
FIG. 3 and FIG. 4 are exploded views of respective variants of a detail of the device of FIG. 2.
Figure 4:
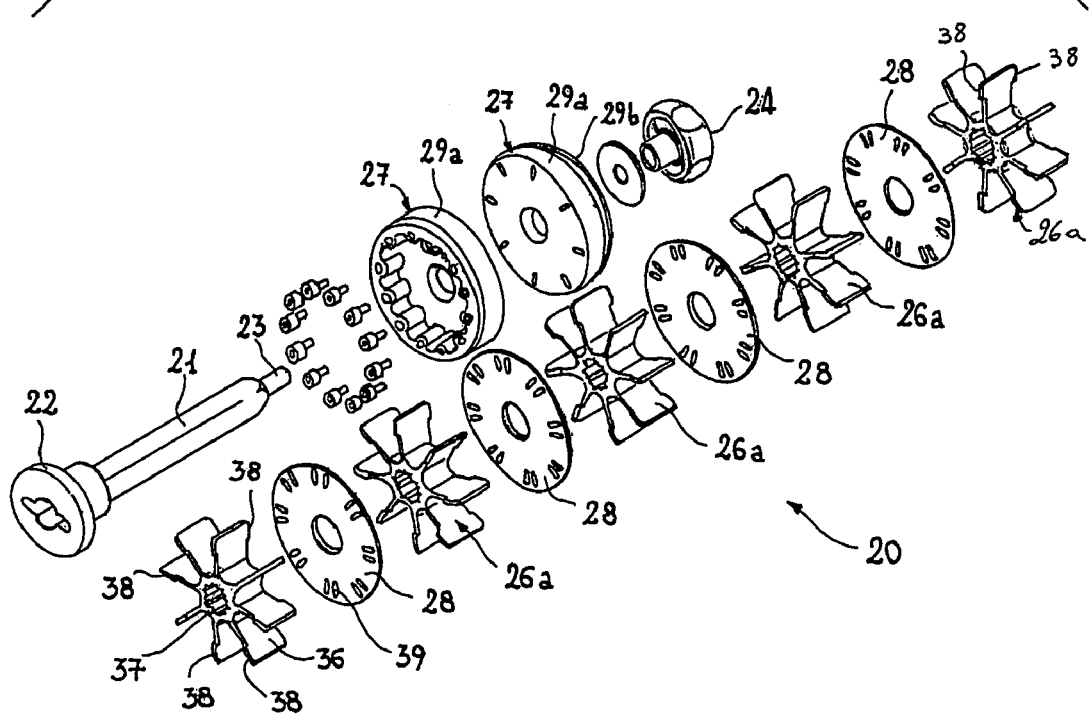
Figure 5:
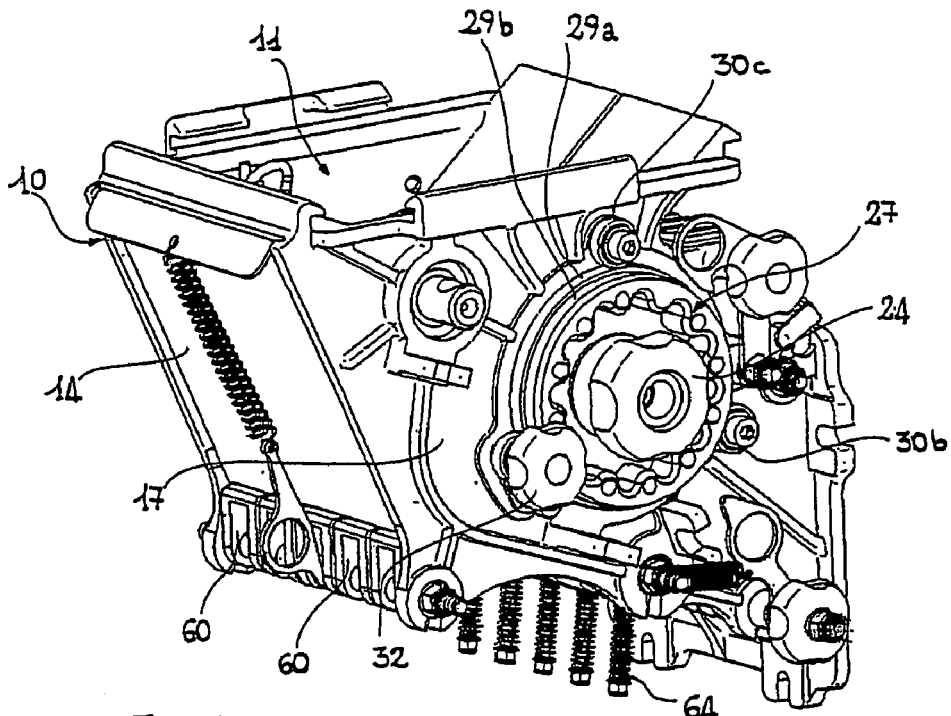
FIGS. 5, 6, and 7 are perspective views of the device of FIG. 2 in the assembled condition, taken from different angles.
Figure 6:
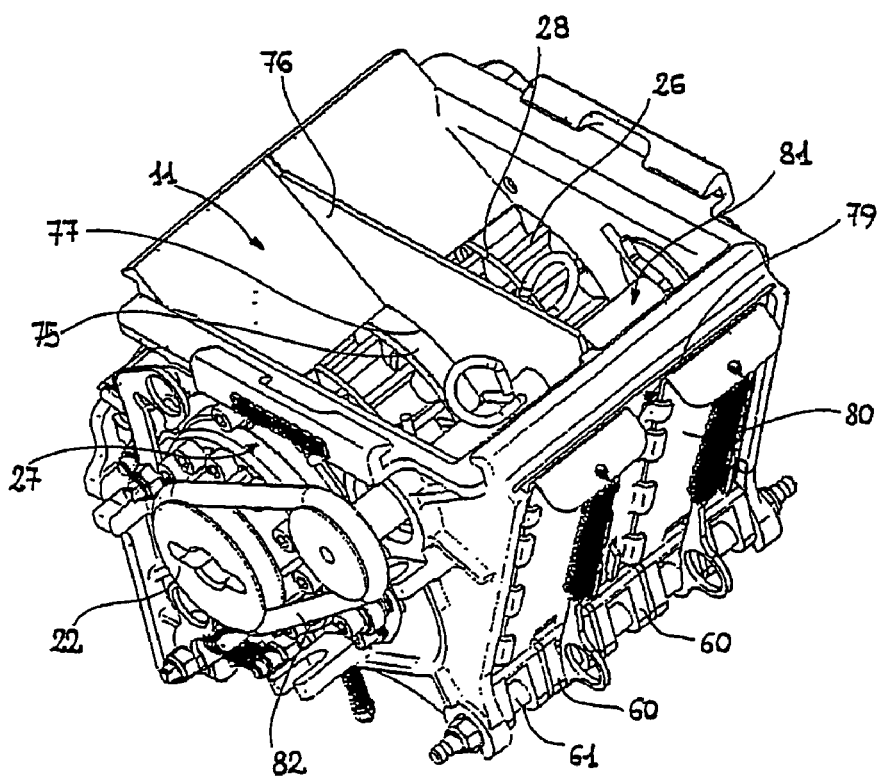
Figure 7:
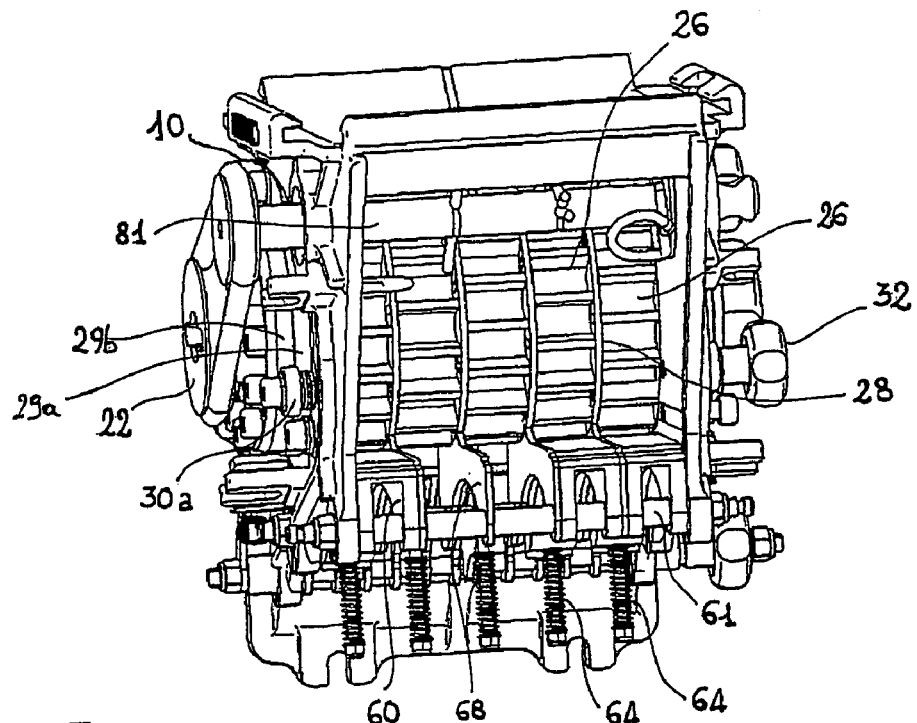
Figure 8:
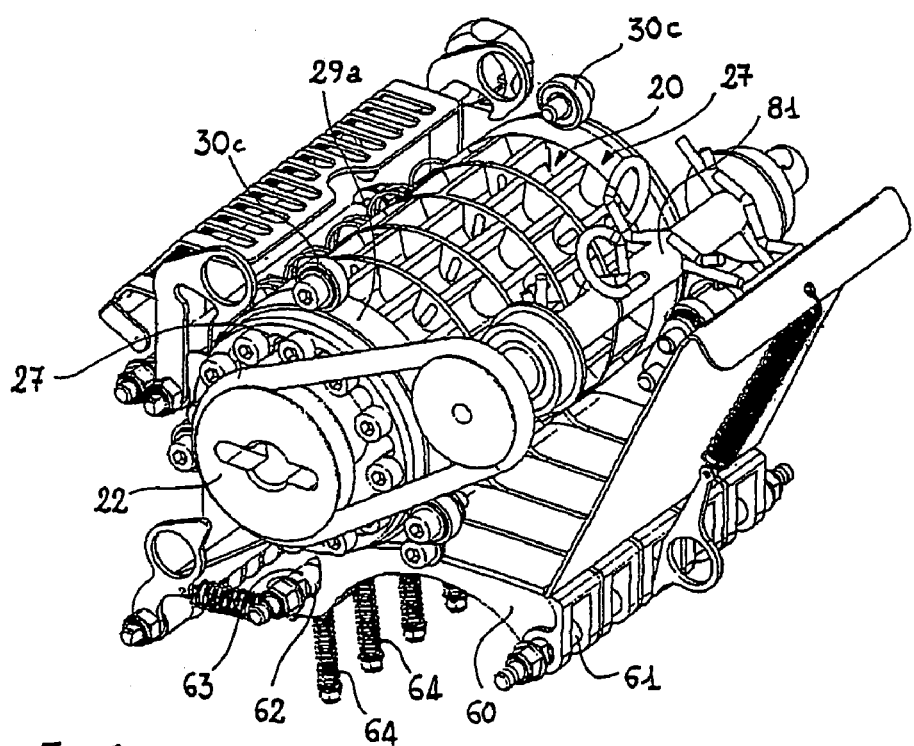
FIGS. 8 and 9 are perspective views of the device of FIG. 2 in an only partially assembled condition, taken from different angles.
Figure 9:
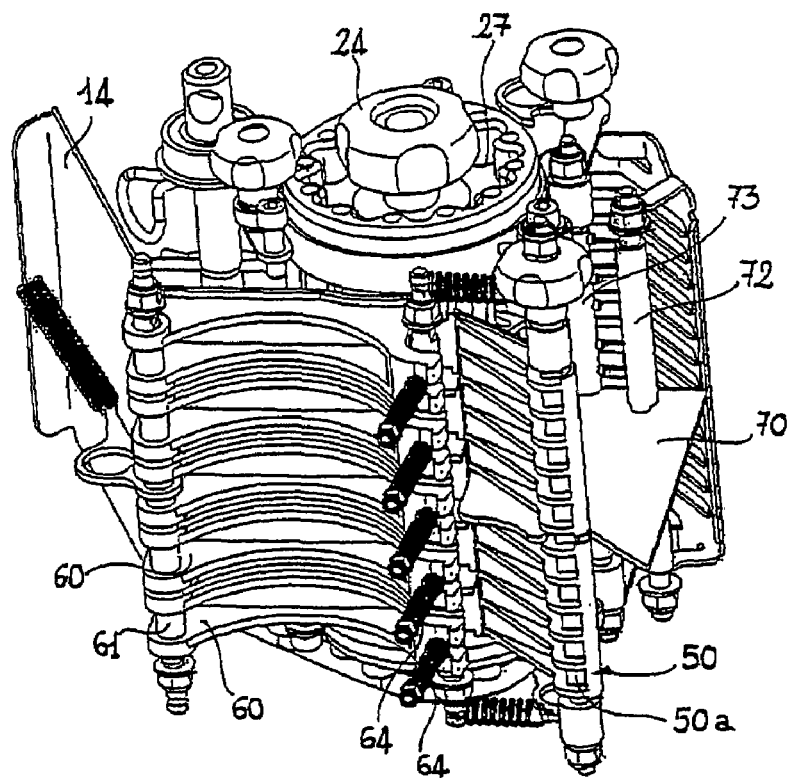

The wheels 26 are interchangeable with second wheels 26a of different volumetric capacity or even with third wheels 40 of low volumetric capacity, which can also be mounted on the shaft 21 with the interposition of a release mechanism 41 (see FIGS. 3 and 4). One or more of the third wheels 40 can thus be disconnected from the drive of the shaft simply by being turned through 180°. In one direction, the release mechanism 41 in fact brings about driving of the third wheel 40 together with the shaft 21 whereas, in the opposite direction, the release mechanism 41 is disengaged from the shaft 21, rendering the third wheel 40 idle. Moreover, for intermediate capacities, the first and second wheels 26, 26a may be combined in the metering member 20 by being arranged alternately in the group of wheels.

A particular problem which is solved by the invention lies in the fact that some minute seeds with a high oil content (typically rape seeds) tend to release greasy substances into the cells of the metering wheels 26 (and into the metering device 5 in general), changing its capacity (to the extent of reducing it to zero). This specific problem has been solved by the invention by providing a special scraper device 50 which is mounted downstream of the region in which the seeds fall. The scraper 50 comprises a shaft 50a on which bow-shaped metal scraper members 51, for example, of harmonic steel, are mounted; the number of scraper members 51 corresponds to the number of third wheels 40. Each scraper member 51 has a crosspiece 52 which can follow the profiles of the cells, deforming the corresponding bow resiliently whilst the third wheel 40 rotates. The shaft 50a is in turn rotatable on the housing 10 between two positions in which the scraper members 51 are disengaged from the wheels or, conversely, are engaged in contact therewith, respectively. Oily residues, which tend to stick to the seeds and to the ever-present dust, are thus removed and fall into the pneumatic seed-conveyor duct in order to be removed from the metering device 5.

Figure 10:
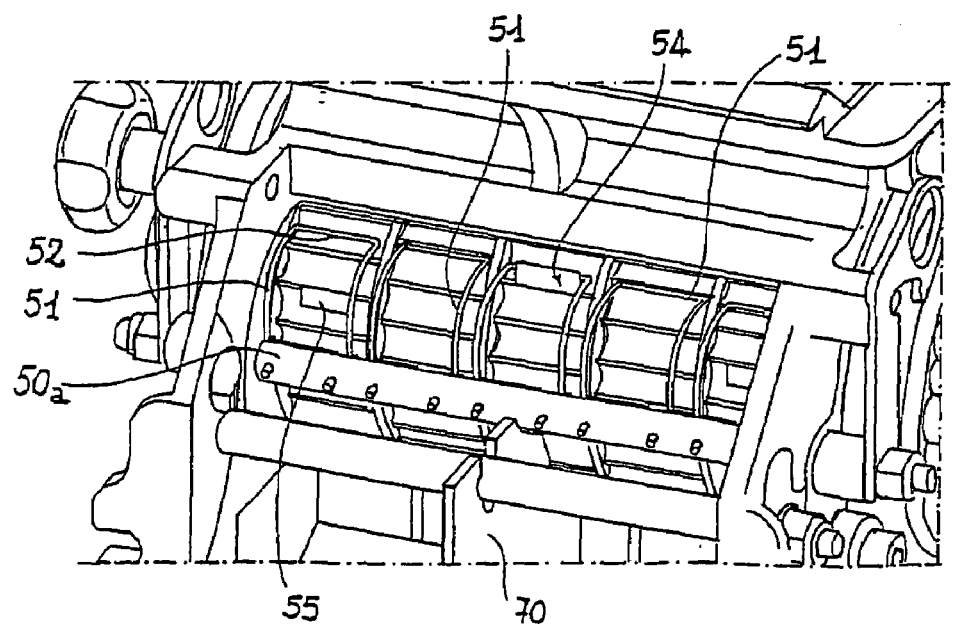
FIG. 10 is a perspective view of a detail of the device of FIG. 2, on an enlarged scale.

Again, with oily seeds, in spite of the provision of release mechanisms, one or more of the wheels which are intended to be rendered idle by being turned around on the shaft 21 may nevertheless be rotated as a result of the internal friction which is increased by the presence of residues of dirt. To prevent this from occurring, the third wheels 40 according to the present invention have, in one or more of the cells formed in their surfaces between adjacent blades 36, respective tooth-like formations 54 which, in one direction of rotation, offer the crosspieces 52 of the scraper members 51 an inclined rear face 55 on which the crosspiece 52 does not grip whereas, in the other direction of rotation, they offer the crosspiece 52 a substantially radial leading face with which the crosspiece 52 engages, preventing further driving of the third wheel 40. An example of this function relates to the central wheel of FIG. 10.

The ability to release the scrapers 50 from the third wheels 40 when they are not required considerably reduces wear of the scrapers 50, maintaining their effective life.

A further advantageous aspect of the invention lies in the structure and functional capacity of the feeler member 16. In known solutions, this member is generally constituted by a pivoting scraper blade provided with a resilient rubber lip. The main disadvantages resulting from this structure are connected with the fact that, with variations in the rate of rotation of the metering member 20, the rubber lip deforms, varying the flow-rate of the metering device 5 in a non-predetermined manner. Moreover, the passage of any foreign body (a stone or the like) can block its pivoting in the open position, with a consequent unexpected change in the metering.

The feeler member 16 according to the invention comprises a plurality of individual feeler elements 60, each having a first end engaged on a shaft 61 and each carrying, at its opposite end, a fork 62 which houses a further shaft 63 with predetermined clearance. (By "predetermined" is meant a clearance that is chosen, determined, or known beforehand or in advance of operation.) The fork prong 66 facing the metering member 20 carries a resilient lip 67. Both of the shafts 61, 63 are supported between the side walls 17 of the housing 10.

The feeler elements 60 are spaced apart by fixed plate-shaped separators 68, which are also articulated on the shaft 61 at one end and engage the shaft 63 with their opposite ends, but without the ability to pivot about the shafts.

In the region of the fork 62, there are resilient preloading mechanisms, each including a helical spring 64 and a respective stay 65, which urge the respective feeler element 60 towards the corresponding metering wheel. However, the feeler element 60 is kept spaced therefrom by the interaction of the corresponding prong 66 of the fork 62 with the shaft 63. Alternatively, similar resilient preloading mechanisms are arranged to be active at the opposite end of each feeler element 60. It is thus possible to apply to the feeler elements 60 a predetermined resilient preloading, preferably of the order of about 1.5 kg, without this leading to compression of the lip 67 against the metering member 20 which, in conventional systems, is a potential cause of rupture of the seeds distributed. On the other hand, the feeler elements 60 can perform oscillations about the shaft 61 which are limited by the other prong of the fork 62 so as to prevent the feeler member 16 from opening completely, significantly altering the distribution parameters. This precaution is augmented by the provision of individual and independent feeler elements 60 for each wheel.

With these mechanisms for limiting the pivoting of the feeler member 16, breakages of the feeler elements 60 could occur should foreign bodies of dimensions larger than the maximum opening between the feeler elements 60 and the respective wheels pass through the metering member 20. To prevent this, according to a further characteristic of the invention, each separator 68 is arranged to have a nib 69 of a shape and size such as to alter the angle of introduction between the feeler elements 60 and the metering member 20 so that foreign bodies arriving in the introduction opening between the feeler elements 60 and the metering member 20 are "rejected" by virtue of the increased amplitude of the angle of introduction as defined above and are prevented from entering the introduction opening. By way of indication, the angle of introduction as varied by the provision of the nibs 69 is about 80°.

According to a further characteristic of the invention, a flow separator 70 may be arranged in the region of the third opening 15 for admitting the granular material into the air-flow which is responsible for its transportation. The flow separator 70 is of the type comprising a fixed plate supported, by notches 71, on shafts 72, 73 extending between the side walls 17 of the housing 10. The shaft 72 also supports respective surfaces for collecting the seed and sending it to the air injector 4.

On the side facing the metering member 20, the flow separator 70 is a plate with an arcuate profile 74 complementary with the outer surface of a toothless wheel 75 which is fitted centrally between the metering wheels 26. It is thus possible, with a single metering device 5, to supply two distributors 6 and respective blowers 3 separately, in fact doubling the capacity of the machine 1.

According to an additional characteristic of the invention, a second separator 76 may be disposed in the housing 10, upstream of the metering member 20, so as to separate, not only at the output but also at the input, products which may optionally be different and which can be metered by a single metering device 5. The second separator 76 comprises a fixed plate, also provided with an arcuate profile 77 complementary with the surface of the toothless wheel 75, and has teeth 78 for engagement on a plate 79 which is equipped with two doors 80 and can replace the door 14 when this arrangement is selected. Amongst the advantages conferred by this technical solution is the fact that it is possible to distribute different products through the right-hand and left-hand sides of the same metering device 5. For example, it is possible to construct sowing machines with double seed-loading hoppers and a single metering device 5 suitable, for example, for sowing alternating bands of male and female plants for the production of selected hybrids. That is, it is possible to distribute different products simultaneously, optionally with different metering, adjustable in dependence on the type of metering wheels 26 used for the right-hand and left-hand sides.

Finally, a stirrer 81 is provided, supported rotatably between the side walls 17 of the housing 10 and rotated by the joint 22, by a belt transmission 82.

The metering device of the present invention thus achieves the objects indicated, at the same time offering many advantages over the prior art, amongst which is greater ease of handling during operations to assemble and dismantle the individual components. Although illustrated and described above with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. A volumetric metering device for the metered delivery of granular and powdery materials, the device adapted for use with a machine for distributing such materials and comprising:
   a housing having two juxtaposed walls interconnected to each other by at least one interconnecting member so that the walls are rigidly held in a spaced-apart relationship, the housing being molded of plastic material and formed in a monolithic, integral, single piece; and
   a metering member supported rotatably in the housing.

2. The device according to claim 1 in which the housing has an input and a region including an output opening and the device further comprises first flow-separator means disposed in the region of the output opening of the housing.

3. The device according to claim 2 in which the first separator means comprises a fixed plate supported, by notches, on shafts extending between side walls defined in the housing, the plate having, on the side facing the metering member, an arcuate profile complementary with the outer surface of a toothless wheel which is fitted centrally between metering wheels of the metering member.

4. The device according to claim 3 further comprising second separator means disposed in the housing upstream of the metering member so as to separate products, which may optionally be different, at the input.

5. The device according to claim 4 in which the second separator means comprises a fixed plate having an arcuate profile complementary with the surface of the toothless wheel.

6. A volumetric metering device for the metered delivery of granular and powdery materials, the device adapted for use with a machine for distributing such materials and comprising:
   a housing having juxtaposed openings each with a dimension; and
   a metering member having at least one metering wheel clamped between a pair of flanges, the dimension of at least one juxtaposed opening of the housing allowing the metering member, complete with the at least one metering wheel and the flanges, to pass from and towards the housing, at least one of the flanges being arranged to close the respective opening when the metering member is fitted in the operative position in the housing, and providing rotatable support of the metering member in the housing;
   wherein the flanges carry peripherally at least two rolling tracks for at least one bearing or wheel, a shoulder being defined between the tracks, and the at least one bearing or wheel being restrained on the housing for the rotatable support of the metering member and for the axial restraint thereof via the shoulder.

7. The device according to claim 6 in which both of the openings have dimensions such as to allow the metering member, complete with the at least one wheel and the flanges, to pass from and towards the housing, both of the flanges being arranged to close the respective openings when the metering member is fitted in the operative position in the housing, and providing rotatable support of the metering member in the housing.

8. The device according to claim 6 in which at least one of the bearings or wheels is removable from the housing to allow the metering member to be moved away from and towards the housing.

9. The device according to claim 6 in which the at least one metering wheel can be interchanged, combined, or both interchanged and combined with wheels of different dimensions.

10. The device according to claim 6 in which the housing has an input and a region including an output opening and the device further comprises first flow-separator means disposed in the region of the output opening of the housing.

11. The device according to claim 10 in which the first separator means comprises a fixed plate supported, by notches, on shafts extending between side walls defined in the housing, the plate having, on the side facing the metering member, an arcuate profile complementary with the outer surface of a toothless wheel which is fitted centrally between metering wheels of the metering member.

12. The device according to claim 11 further comprising second separator means disposed in the housing upstream of the metering member so as to separate products, which may optionally be different, at the input.

13. The device according to claim 12 in which the second separator means comprises a fixed plate having an arcuate profile complementary with the surface of the toothless wheel.

14. A volumetric metering device for the metered delivery of granular and powdery materials, the device adapted for use with a machine for distributing such materials and comprising:
   a metering member including a plurality of metering wheels which are structurally independent of one another and are interposed in a group between a pair of flanges, and a shaft acting as a tie between the flanges in order to clamp in a group the flanges and the metering wheels interposed between them, to constitute a unit which can be handled individually;
   a housing having an input and a region including an output opening; and
   first flow-separator means disposed in the region of the output opening of the housing and having a fixed plate supported, by notches, on shafts extending between side walls defined in the housing, the plate having, on the side facing the metering member, an arcuate profile complementary with the outer surface of a toothless wheel which is fitted centrally between the metering wheels of the metering member.

15. The device according to claim 14 in which the shaft comprises, at one of its ends, a joint for connection to a drive shaft.

16. The device according to claim 15 in which the shaft has means for clamping the group of flanges and wheels at the end remote from the joint, the joint acting as an abutment shoulder for the clamping.

17. The device according to claim 14 in which the shaft has a polygonal cross-section.

18. The device according to claim 17 in which each of the metering wheels has a hub having a hole of polygonal cross-section configured to be coupled with the polygonal cross-section of the shaft.

19. The device according to claim 18 in which the holes in the hubs of the metering wheels have channelled profiles configured for coupling with the profile of the shaft and the number of channels is a multiple of the number of sides of the shaft so as to permit various angular positionings of the metering wheels on the shaft.

20. The device according to claim 14 in which the metering wheels can be interchanged, combined, or both interchanged and combined with wheels of different dimensions.

21. The device according to claim 14 further comprising second separator means disposed in the housing upstream of the metering member so as to separate products, which may optionally be different, at the input.

22. The device according to claim 21 in which the second separator means comprises a fixed plate having an arcuate profile complementary with the surface of the toothless wheel.

23. A volumetric metering device for the metered delivery of granular and powdery materials, the device adapted for use with a machine for distributing such materials and comprising a metering member carrying a plurality of metering wheels each having a hub with blades that extend radially from the hub and clamped together in a group, the blades having appendages located proximate the free ends of the blades to strengthen the blades and restraining the blades of one wheel on the blades of the adjacent wheel.

24. The device according to claim 23 further comprising a disc having holes for the appendages, the disc being interposed between adjacent metering wheels and constituting an interconnection element between the blades of adjacent wheels.

25. The device according to claim 24 in which the disc has seats for the appendages, the seats being offset relative to one another to permit an angularly offset interconnection of the sets of blades of adjacent wheels.

26. The device according to claim 23 in which the metering wheels can be interchanged, combined, or both interchanged and combined with wheels of different dimensions.

27. The device according to claim 23 further comprising a housing having an input and a region including an output opening, and first flow-separator means disposed in the region of the output opening of the housing.

28. The device according to claim 27 in which the first separator means comprises a fixed plate supported, by notches, on shafts extending between side walls defined in the housing, the plate having, on the side facing the metering member, an arcuate profile complementary with the outer surface of a toothless wheel which is fitted centrally between the metering wheels of the metering member.

29. The device according to claim 28 further comprising second separator means disposed in the housing upstream of the metering member so as to separate products, which may optionally be different, at the input.

30. The device according to claim 29 in which the second separator means comprises a fixed plate having an arcuate profile complementary with the surface of the toothless wheel.

31. A volumetric metering device for the metered delivery of granular and powdery materials, the device adapted for use with a machine-s for distributing such materials and comprising a metering member having metering wheels clamped in a group and keyed to a common drive-transmission shaft, and selective drive-transmission means interposed between the wheels and the shaft in order to exclude the wheels from driving by the shaft or, conversely, to connect the wheels for driving by the shaft, wherein the metering wheels are mounted reversibly on the shaft and the selective drive-transmission means comprises a release mechanism which brings about the driving connection between wheels and shaft in a first mounting condition and disconnection between wheels and shaft in a second mounting condition, in which the metering wheels are turned through 180° relative to the first mounting condition.

32. The device according to claim 31 further comprising a scraper active on the wheels individually to remove deposits therefrom.

33. The device according to claim 32 in which the scraper comprises a plurality of resilient bows each active on the respective wheel individually.

34. The device according to claim 32 in which the scraper is movable relative to the metering member between an operative position in which the scraper is active on the wheels and an inoperative position in which the scraper is spaced therefrom.

35. The device according to claim 32 in which the scraper and the metering wheels comprise a mutual engagement means for restraining the metering wheels in a stationary position when they are excluded from driving by the shaft.

36. The device according to claim 35 in which the mutual engagement means comprises a crosspiece on each scraper and at least one tooth-like element on each metering wheel, the tooth-like element defining a leading face engaging the crosspiece when the metering wheel is oriented in the second mounting condition and defining an inclined rear face which slides relative to the crosspiece when the metering wheel is oriented in the first mounting condition.

37. A volumetric metering device for the metered delivery of granular and powdery materials, the device adapted for use with a machine for distributing such materials and comprising:
   a housing;
   a metering member supported rotatably in the housing;
   a feeler device mounted in the housing and active in the manner of a scraper blade with a lip thereof operative on the metering member;
   restraining means active on the feeler device for maintaining a predetermined distance between the feeler device and the metering member; and
   a resilient preloading mechanism active on the feeler device in order to press its operative lip towards the metering member with predetermined preloading.

38. The device according to claim 37 in which the feeler device comprises a plurality of feeler elements active individually and independently on respective corresponding metering wheels of the metering member.

39. The device according to claim 38 in which the feeler elements are articulated pivotably by their respective ends remote from the operative lip on a shaft fixed to the housing, and means are provided for limiting their pivoting relative to the shaft.

40. The device according to claim 39 in which the means for limiting pivoting comprises, at the end corresponding to the operative lip, a fork-shaped element between the prongs of which a second shaft is housed with predetermined clearance.

41. The device according to claim 37 in which the housing has an input and a region including an output opening and the device further comprises first flow-separator means disposed in the region of the output opening of the housing.

42. The device according to claim 41 in which the first separator means comprises a fixed plate supported, by notches, on shafts extending between side walls defined in the housing, the plate having, on the side facing the metering member, an arcuate profile complementary with the outer surface of a toothless wheel which is fitted centrally between metering wheels of the metering member.

43. The device according to claim 42 further comprising second separator means disposed in the housing upstream of the metering member so as to separate products, which may optionally be different, at the input.

44. The device according to claim 43 in which the second separator means comprises a fixed plate having an arcuate profile complementary with the surface of the toothless wheel.

45. A volumetric metering device for the metered delivery of granular and powdery materials, the device adapted for use with a machine for distributing such materials and comprising
   a housing;
   a metering member supported rotatably in the housing;
   a feeler device mounted in the housing and active in the manner of a scraper blade with a lip thereof operative on the metering member, the feeler device having a plurality of feeler elements active individually and independently on respective corresponding metering wheels; and
   means for altering locally the angle of introduction between the feeler device and the metering member, the means being associated with the feeler device, immediately upstream of the operative lip, and including a plurality of separators interposed between the feeler elements and each having a nib projecting towards the metering device.

46. The device according to claim 45 in which the housing has an input and a region including an output opening and the device further comprises first flow-separator means disposed in the region of the output opening of the housing.

47. The device according to claim 46 in which the first separator means comprises a fixed plate supported, by notches, on shafts extending between side walls defined in the housing, the plate having, on the side facing the metering member, an arcuate profile complementary with the outer surface of a toothless wheel which is fitted centrally between the metering wheels.

48. The device according to claim 47 further comprising second separator means disposed in the housing upstream of the metering member so as to separate products, which may optionally be different, at the input.

49. The device according to claim 48 in which the second separator means comprises a fixed plate having an arcuate profile complementary with the surface of the toothless wheel.

50. A volumetric metering device for the metered delivery of granular and powdery materials, the device adapted for use with a machine for distributing such materials and comprising:
   a metering member having metering wheels clamped in a group and keyed to a common drive-transmission shaft, and selective drive-transmission means interposed between the wheels and the shaft in order to exclude the wheels from driving by the shaft or, conversely, to connect the wheels for driving by the shaft;
   a housing having an input and a region including an output opening; and
   first flow-separator means disposed in the region of the output opening of the housing.

51. The device according to claim 50 in which the first separator means comprises a fixed plate supported, by notches, on shafts extending between side walls defined in the housing, the plate having, on the side facing the metering member, an arcuate profile complementary with the outer surface of a toothless wheel which is fitted centrally between the metering wheels of the metering member.

52. The device according to claim 51 further comprising second separator means disposed in the housing upstream of the metering member so as to separate products, which may optionally be different, at the input.

53. The device according to claim 52 in which the second separator means comprises a fixed plate having an arcuate profile complementary with the surface of the toothless wheel.

54. A volumetric metering device for the metered delivery of granular and powdery materials, the device adapted for use with a machine for distributing such materials and comprising a metering member including a plurality of metering wheels which are structurally independent of one another and are interposed in a group between a pair of flanges, and a shaft acting as a tie between the flanges in order to clamp in a group the flanges and the metering wheels interposed between them, to constitute a unit which can be handled individually; wherein the shaft has a polygonal cross-section, each of the metering wheels has a hub having a hole of polygonal cross-section configured to be coupled with the polygonal cross-section of the shaft, and the holes in the hubs of the metering wheels have channelled profiles configured for coupling with the profile of the shaft and the number of channels is a multiple of the number of sides of the shaft so as to permit various angular positionings of the metering wheels on the shaft.

* * * * *